United States Patent

[11] 3,569,926

[72] Inventors Richard A. Korn
 Burbank;
 Milo E. Stormo, Granada Hills, Calif.
[21] Appl. No. 808,480
[22] Filed Mar. 19, 1969
[45] Patented Mar. 9, 1971
[73] Assignee Singer General Precision, Inc.

[54] FLIGHT PATH AND SPEED COMMAND DISPLAY
 6 Claims, 4 Drawing Figs.
[52] U.S. Cl. ............................................. 340/27
[51] Int. Cl. ........................................... B64d 43/02
[50] Field of Search.......................................... 340/27
 (NAV)

[56] References Cited
 UNITED STATES PATENTS
3,005,185 10/1961 Cumming et al.............. 340/27
3,190,585 6/1965 Busch et al. ................. 340/27

Primary Examiner—Kathleen H. Claffy
Assistant Examiner—Jan S. Black
Attorneys—Joseph R. Dwyer and Linval B. Castle ABSTRACT: An electro-optical aircraft flight instrument that accepts input signals representing angle of attack and pitch angle and used these signals to drive servo reticles which, together with a fixed reticle, are projected at infinity upon a transparent screen in the pilot's normal line of sight. The servoed reticles display flight path of the aircraft and the angle, in degrees, between that flight path and the horizon, while the fixed reticle shows the extension of the aircraft longitudinal axis, or datum line, and a speed control which, together with the projected flight path reticle, displays to the pilot the proper landing approach speed, and warns him of a stall approach speed.

Patented March 9, 1971

INVENTORS:
RICHARD A. KORN
MILO E. STORMO
BY
ATTORNEYS

Patented March 9, 1971

INVENTORS:
RICHARD A. KORN
MILO E. STORMO

BY

ATTORNEYS

FLIGHT PATH AND SPEED COMMAND DISPLAY

CROSS REFERENCE TO RELATED APPLICATIONS

The invention disclosed herein is an improvement over that described in copending patent application Ser. No. 744,397, filed Jul. 12, 1968, and entitled "Flight Path Display." It is also an improvement over the invention described in copending patent application Ser. No. 778,520, filed Nov. 25, 1968, entitled "Alpha-Gamma Flight Path Display." These two copending applications describe a similar type of flight instrument that projects upon a transparent screen in the pilot's line of sight, information relating to the flight path of the aircraft.

BACKGROUND OF THE INVENTION

There are many types of instruments that aid the pilot in making approaches and landings during inclement weather when the airport is below visual flight rule conditions. However, when the weather is clear and when instrument landing facilities are not available, the pilot is without external assistance and must rely solely upon his own judgment in planning his landing approach. While this presents no serious problem to pilots of smaller aircraft, it may become serious in larger aircraft, which, when in a landing configuration, cannot really be maneuvered to correct for unusual deviations from the intended flight path. This invention assists the pilot in planning an accurate approach by projecting at infinity into the pilot's line of sight, and against a background of the airport runway, illuminated marks showing the flight path of the aircraft and therefore the precise point upon the runway at which the aircraft will touch down, the pitch angle of the aircraft and a speed command which, in conjunction with the flight path marker, indicates to the pilot whether he is landing too fast, too slow or at a proper approach speed.

In order to decrease aircraft generated noise around some of the large metropolitan airports, there are statutes in some areas that require large aircraft to approach the airport at a glide slope angle of not less than six degrees. This invention provides an accurate means of determining such a glide slope angle by providing a scale, calibrated in degrees and projected at infinity into the pilot's line of sight upon a transparent screen. The zero degree mark on the scale is positioned by the circuitry to remain fixed upon the horizon and will show, in degrees, the angle between the horizon and any object viewed by the pilot through the transparent screen. Thus, the pilot may easily set up a desired glide slope angle by merely positioning his aircraft so that the flight path mark is aligned with the selected glide slope angle viewed through the screen and also coincides with the desired touchdown point on the aircraft runway. In addition to a flight path marker, a speed control marker is provided which indicates to the pilot whether he is approaching the runway at a speed faster or slower than the recommended over-the-fence speed for that particular aircraft. Therefore, by judicious use of power and flap settings the pilot is able to set up a proper landing approach which, at the proper approach speed, will enable him to touchdown at the precise preselected point on the airport runway.

SUMMARY OF THE INVENTION

Briefly described, the invention comprises an optical display instrument which receives signals representing pitch angle and angle of attack from the aircraft sensors. These signals drive servoes which position a pair of back-lighted reticles which, together with a stationary reticle are located in the principle focal plane of an optical system that projects the reticle images upon a transparent combining glass or screen positioned in the pilot's line of sight. Because these images projected into the pilot's sight are focused at infinity, the pilot, without eye refocusing observes the images as if they were projected upon the terrain or sky background. One of the servo driven reticles is an index bar which, in response to an angle of attack input signal, indicates to the pilot the flight path of the aircraft. A second servo driven reticle that it is projected together with the index bar displays a scale, calibrated in degrees with the zero degree marker always appearing at the horizon, so that the pilot may observe the actual glide slope angle of the aircraft. A third reticle which is stationary with respect to the housing of the display instrument projects a mark representing the aircraft longitudinal axis or datum line and also includes reticles representing the stall speed of the particular aircraft and the proper approach or over-the-fence speed for that particular aircraft.

DESCRIPTION OF THE DRAWINGS

In the drawings which illustrate a preferred embodiment of the invention.

DETAILED DESCRIPTION

Figure 1:
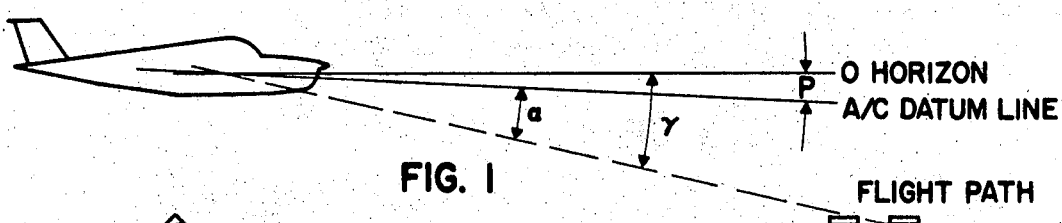
FIG. 1 is a diagram showing aircraft pitch, slide path and angle of attack.

FIG. 1 is presented to assist in a better understanding of the invention and shows an aircraft during descent. The aircraft center line, designated on the drawing as the datum line, shows that the aircraft is pitched below the horizon by an angle, P. This angle is identical with that displayed by the artificial horizon instrument on the pilot's instrument panel.

The aircraft illustrated in FIG. 1 is operating with reduced power since the flight path of the aircraft makes a relatively large angle with the aircraft datum line. This flight path angle is the angle of attack of the aircraft which may be defined as the angle between the aircraft datum line and relative wind, i.e., the flight path. Angle of attack information is available from a number of commercially available types of sensors that are designed to produce electrical signals proportional to the angle of attack of the aircraft. Such sensors are manufactured by companies such as Lear Siegler, United Controls, etc.

As shown in the drawings, the glide slope angle, $\gamma$, is the algebraic sum of the angle of attack, $\alpha$, and the pitch angle, P. Glide slope angle is the angle that the aircraft flight path makes with the horizon, as shown in FIG. 1.

Figure 2:
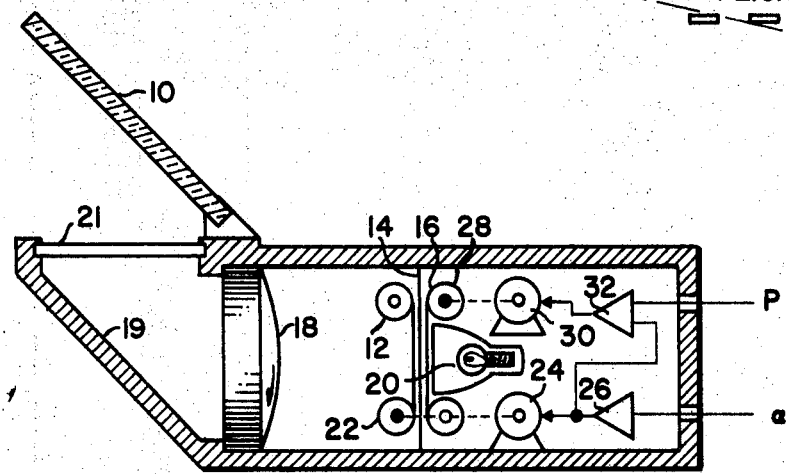
FIG. 2 is a schematic diagram of the flight path display instrument.

FIG. 2 is a simplified schematic diagram of the flight path and speed command display instrument. The instrument will accept input signals representing the angle of attack, $\alpha$, and the pitch angle, P, and will project, into the pilot's line of sight, reticle images representing the glide slope angle, $\gamma$, the angle of attack $\alpha$, and marks representing the aircraft datum line and speed control. The display instrument shown in FIG. 2, comprises a transparent screen, or combining glass 10, which is coated with a thin optical coating upon which may be projected the image of the reticles in the display instruments. The reticles are printed on tapes 12, 14 and 16, which are located at the principle focal plane of a collimating lens 18. A projection lamp 20 is placed behind tapes 12, 14 and 16, so that the illuminated reticles on those tapes are projected through collimating lens 18 to the combining glass 10.

In order to prevent sunlight from entering the instrument and becoming focused upon the reticle tape, a narrow band optical notch filter may be applied to one surface of a cover glass 21 which should be mounted in the optical path to protect the mirror 19 and collimating lens 18 from dust and damage. The notch filter on glass 21 should be matched with the peak light wavelength emanating from lamp 20 so that the reticle images are sufficiently bright while very little damaging light can enter the instrument.

Tape 12 contains the flight path reticle and, accordingly, tape 12 must be moved in accordance with the variations in angle of attack, $\alpha$, determined by the aircraft sensors. Tape 12 is therefore wound upon a take up reel 22, which is driven by a servo motor 24 controlled by the angle of attack input signal amplified in amplifier 26. Similarly, tape 16, which contains the reticles displaying glide angle, in degrees above or below the horizon, is moved by reel 28, which is controlled by motor 30, which in turn responds to amplifier 32. It will be noted that amplifier 32 receives input signals representing both angle of attack and pitch angle. Both of these values are obtainable from the aircraft sensors and must be combined in amplifier 32, since, as shown in FIG. 1, the glide slope angle, $\gamma$, is the sum of pitch angle, P, and angle of attack, $\alpha$.

Figure 3:
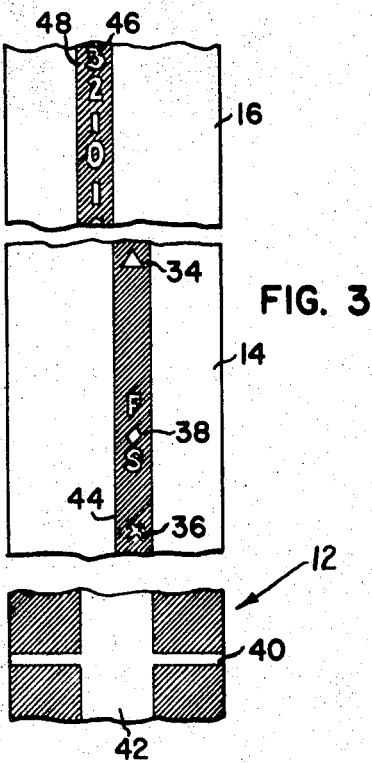
FIG. 3 is an illustration showing an embodiment in which the reticles are printed upon three tapes.

Tape 14 contains three reticles representing the datum line of the aircraft, a speed control and the stall point. As previously mentioned, the datum line is the extension of the longitudinal axis of the aircraft and this reticle, which may be represented by a triangle 34 as shown on tape 14 in FIG. 3, is always stationary with respect to the aircraft. Accordingly, tape 14 is a stationary tape and may be mounted directly to the housing of the instrument, as shown in FIG. 2. The position of the stall reticle 36 and the speed control reticle 38 upon tape 14 will depend upon the particular characteristics of the aircraft. Stall reticle 36 must be positioned below datum reticle 34 b6 an amount representing the angle of attack at which the particular aircraft will stall. Since it is generally considered that the proper approach, or over-the-fence, speed of an aircraft is 1.3 times the stall speed, speed control reticle 38 is positioned above stall reticle 36 by an amount representing this value. The approximate relative positions of the stall reticle 36 and the speed control reticle 38, with respect to the datum reticle 34 is shown on tape 14 in FIG. 3. Also shown in FIG. 3 is the flight path reticle 40 appearing on tape 12. The flight path reticle 40 is a transparent cross bar printed on a tape that is completely opaque except for a center longitudinal section 42, which is provided to permit the projection of the reticles on tapes 14 and 16. Tape 14 contains a transparent datum reticle 34, stall reticle 36 and speed control reticle 38 printed upon an opaque strip 44 of tape 14. Tape 16 contains the transparent reticle 36 of a scale representing flight path angle, in degrees above or below the horizon. This transparent reticle is printed on an opaque strip 48. As shown in FIG. 3, the widths of opaque strips 44 and 48 are such that they will occupy the width of the transparent section 42 of tape 12. Therefore, when tapes 12, 14 and 16 overlay each other, as shown in FIG. 2, only the respective reticles on each tape will be projected through the collimating lens 18 to the combining glass 10 in the pilot's line of sight.

OPERATION

Figure 4:
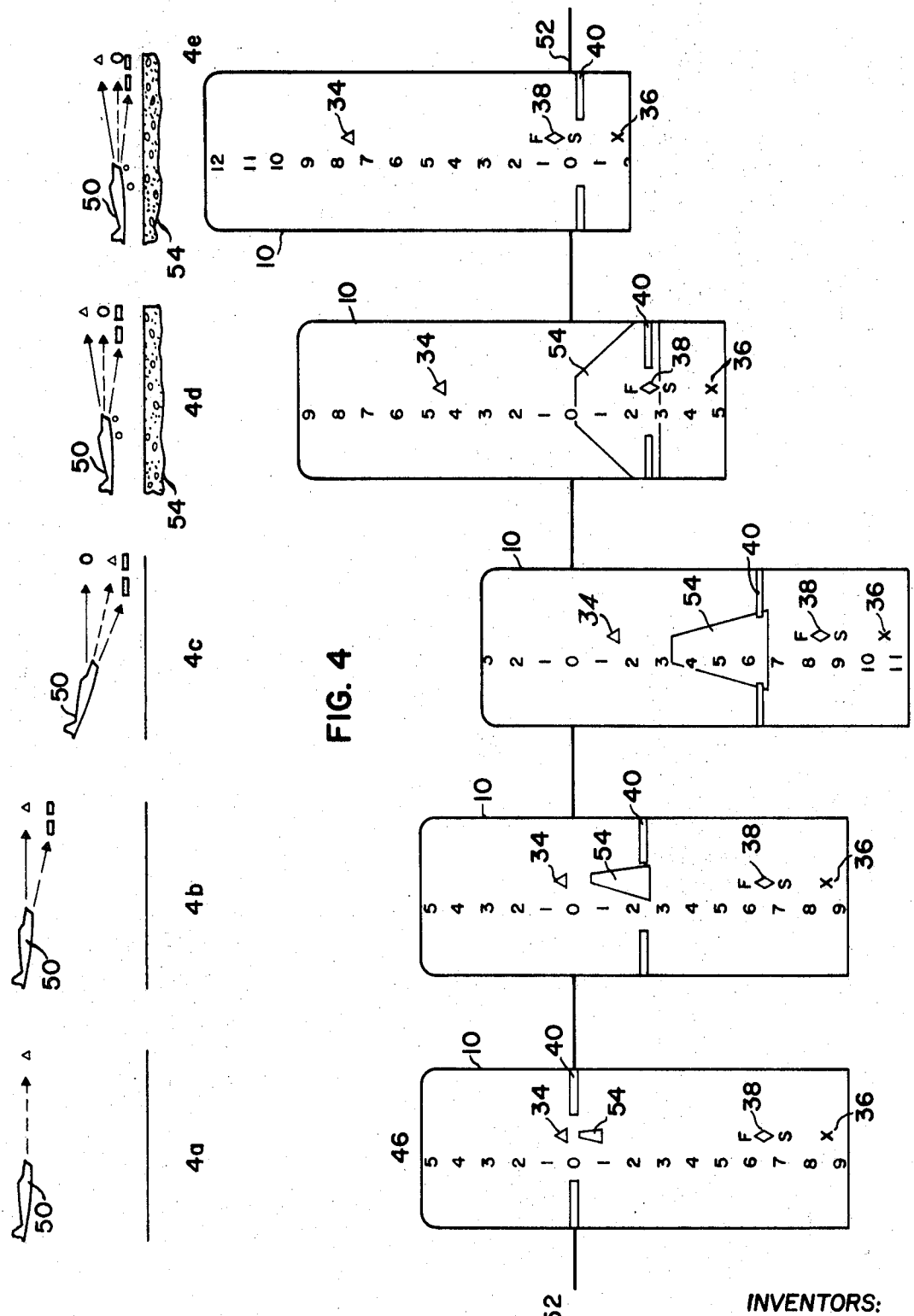
FIG. 4 is an illustration showing how the flight path and speed command instrument presents information to the pilot during five stages of an approach to a landing.

FIG. 4 is presented to show the operation of the flight path and speed command display at various attitudes of the aircraft while in cruise approach to landing, and landing configurations. In FIG. 4a the aircraft 50 is shown in horizontal cruise configuration. In such an attitude, the pilot's view through the combining glass 10, as shown in the drawing below the aircraft, would show that the image of the aircraft datum reticle 34 is positioned approximately ½° above horizon 52. The cross bar of the flight path reticle 40 is projected upon horizon 52 and indicates that aircraft 50 is in horizontal flight. An airport runway 54 is seen through the combining glass 10 to appear near the horizon and at an appreciable distance.

In FIG. 4b, the pilot has begun an approach to a landing at runway 54, and has decelerated the aircraft 50 while maintaining a straight and level cruise attitude. Shown below aircraft 50 in FIG. 4b is the combining glass 10 through which the pilot will see the horizon 52 and the aircraft datum mark 34 still positioned approximately ½° above horizon 52. By slowing the aircraft, the pilot has increased the angle of attack so that the plane 50 is settling. This angle is shown by the position of the cross bars of the flight path mark 40 near the threshold of airport 54. If the po pilot continues to control the aircraft so that the flight path mark 40 remains at this threshold point, the aircraft will touch ground at this point on the runway.

In FIG. 4c, the datum line of aircraft 50 is shown to be below the horizon and the aircraft is in a glide. As viewed by the pilot through combining glass 10, the aircraft datum mark 34 shows a pitch angle of approximately 1½° below the horizon. Crossbars of the flight path mark 40 still appear to the pilot to be projected against the threshold of runway 54. The glide path angle, $\gamma$, indicates that the flight path is approximately 6½° below the horizon 52 and if the pilot wishes to know the precise angle of attack $\alpha$, it is only necessary to subtract the value of the pitch angle from this flight path angle. As the angle of attack increases, the cross bar of the flightpath mark 40 approaches the speed control mark 38. The center diamond of this speed control mark is positioned to represent a speed of 1.3 times the stall speed of the aircraft and is generally considered to be the optimum over-the-fence speed. In FIG. 4c, the flight path mark 40 has not yet reached the speed control mark 38 and aircraft 50 is approaching faster than this generally accepted over-the-fence speed.

In FIG. 4d aircraft 50 is crossing the runway threshold and is decelerating. The pilot, viewing the combining glass 10, will see that the nose of the aircraft is above the horizon 52 by 4½° shown by the datum mark 34. The aircraft is settling toward runway 54 at an angle of approximately 2½°, as indicated by the flight path reticle 40, and the flight path mark is centered upon the center diamond of the speed control mark 38 to indicate to the pilot that he is at the recommended over-the-fence speed of 1.3 times the stall speed.

In FIG. 4e aircraft 50 is approaching a full stall landing upon runway 54. Combining glass 10 in the pilot's line of eight sight shows the aircraft to be nose high by an amount indicated by datum mark 34. The flight path mark 40 is only slightly below the horizon 52 to show that there is practically no vertical component of the flight path angle. The aircraft is decelerating and the angle of attack is becoming greater, as evidenced by the growing separation between the datum mark 34 and the flight path mark 40. The flight path mark 40 is shown on the slow side of the speed control mark 38 and the pilot may expect the aircraft to stall if the flight path mark 40 coincides with the stall mark 36. If the flight path mark 40 coincides with the horizon at the moment the aircraft touches the runway, it is obvious that a very smooth landing will result and without danger of bounce.

We claim:
1. A display instrument for projecting aircraft data into the pilot's normal line of sight, said instrument comprising: a transparent combining glass positioned in the line of sight of the pilot and having a surface for reflecting projected images into the pilot's line of sight; a housing fixed with respect to the aircraft; a first movable member mounted in said housing and including a first reticle; first servo means responsive to the output signals from an angle of attack sensor and a pitch angle sensor for moving said first movable member in accordance with glide slope angle of the aircraft; a second movable member mounted in said housing and including a second reticle; second means responsive to output signals from an angle of attack sensor for moving said second movable member in accordance with the angle of attack of the aircraft; a third member mounted in said housing and fixed with respect to said housing, said third member including a speed control reticle; and optical means for projecting images of said first, second and third reticles, in unison and focused at infinity, onto the surface of said combining glass.

2. The instrument claimed in claim 1, wherein said first reticle comprises a transparent scale calibrated in degrees of flight path angle.

3. The instrument claim in claim 1, wherein said optical means includes a collimating lens in the optical path between said reticles and said combining glass, said first, second and third reticles being positioned substantially in the plane of principal focus of said collimating lens.

4. The instrument claimed in claim 1, wherein said third member includes a transparent reticle representing the datum line of the aircraft.

5. The instrument claimed in claim 1, wherein said first, second and third reticles are transparent reticles, and said first, second and third members are first, second and third opaque tapes, respectively, that are movable with respect to each other, and which includes a light source in said housing for back lighting said reticles.

6. The instrument claimed in claim 4, wherein said third member includes a further transparent reticle representing the stall speed of said aircraft, said stall reticle being spaced from said datum reticle by an amount representing the angle of attack at which the particular aircraft will stall.